(12) United States Patent
Lection et al.

(10) Patent No.: US 11,093,452 B2
(45) Date of Patent: *Aug. 17, 2021

(54) CROWD SOURCED DATA SAMPLING AT THE CROWD

(71) Applicant: INTERNATIONAL BUSINESS MACHINES CORPORATION, Armonk, NY (US)

(72) Inventors: David B. Lection, Raleigh, NC (US); Mark B. Stevens, Austin, TX (US); John D. Wilson, Houston, TX (US)

(73) Assignee: International Business Machines Corporation, Armonk, NY (US)

(*) Notice: Subject to any disclaimer, the term of this patent is extended or adjusted under 35 U.S.C. 154(b) by 1548 days.

This patent is subject to a terminal disclaimer.

(21) Appl. No.: 14/929,472

(22) Filed: Nov. 2, 2015

(65) Prior Publication Data
US 2016/0314149 A1    Oct. 27, 2016

Related U.S. Application Data
(63) Continuation of application No. 14/691,713, filed on Apr. 21, 2015, now Pat. No. 9,858,284.

(51) Int. Cl.
*G06F 16/174* (2019.01)
*G06F 16/23* (2019.01)
*G06F 16/28* (2019.01)

(52) U.S. Cl.
CPC ........ *G06F 16/174* (2019.01); *G06F 16/2365* (2019.01); *G06F 16/282* (2019.01)

(58) Field of Classification Search
None
See application file for complete search history.

(56) References Cited

U.S. PATENT DOCUMENTS 7,035,240 B1 * 4/2006 Balakrishnan ........ H04W 84/18
                                                        370/338
7,721,020 B2   5/2010 Srinivasan
7,936,732 B2   5/2011 Ho et al.
(Continued)

FOREIGN PATENT DOCUMENTS

EP    2518943 B1    10/2012
WO    0317678 A1    2/2003
(Continued)

OTHER PUBLICATIONS

"Mobile Ad hoc Networking (MANET): Routing Protocol Performance Issues and Evaluation Considerations", Jan. 1, 1999, published on IP.com by the Internet Society, IPCOM000003084D.
(Continued)

*Primary Examiner* — Irene Baker
(74) *Attorney, Agent, or Firm* — Jamar K. Ray (57) ABSTRACT

An approach is provided for sampling crowd sourced data. The approach selects an sampling node from a set of crowd nodes. The sampling node receives a data acquisition request from a data collector and receives data from the set of crowd nodes with the data being responsive to the data acquisition request. The received data is processed by the sampling node to reduce redundant data as defined by the data acquisition request. An acquired data message block is generated and transmitted from the sampling node to the data collector.

2 Claims, 7 Drawing Sheets

(56) References Cited

U.S. PATENT DOCUMENTS

| | | | |
|---|---|---|---|
| 8,526,329 | B2 | 9/2013 | Mahany et al. |
| 10,148,709 | B2 | 12/2018 | Boldyrev et al. |
| 10,317,903 | B2 | 7/2019 | Shashua et al. |
| 10,466,955 | B1 | 11/2019 | Gray et al. |
| 2004/0157557 | A1* | 8/2004 | Barnett .............. H04W 36/30 455/41.2 |
| 2007/0185688 | A1 | 8/2007 | Yamamura et al. |
| 2008/0002740 | A1* | 1/2008 | Ramachandran ....... H04L 69/32 370/469 |
| 2008/0219237 | A1* | 9/2008 | Thubert ................. H04L 45/16 370/349 |
| 2008/0253327 | A1* | 10/2008 | Kohvakka ............... H04L 67/12 370/330 |
| 2009/0248711 | A1* | 10/2009 | Martinez ................ G06F 16/10 |
| 2010/0208662 | A1* | 8/2010 | Fuste Vilella ........ H04W 40/00 370/328 |
| 2010/0302945 | A1* | 12/2010 | Leppanen ........... H04W 40/246 370/235 |
| 2011/0117934 | A1* | 5/2011 | Mate ..................... H04W 24/00 455/456.3 |
| 2012/0197856 | A1* | 8/2012 | Banka ................. H04L 67/2885 707/706 |
| 2012/0278430 | A1 | 11/2012 | Lehane et al. |
| 2013/0046847 | A1* | 2/2013 | Zavesky ............ H04N 21/4223 709/217 |
| 2013/0275170 | A1 | 10/2013 | Kern et al. |
| 2014/0018097 | A1* | 1/2014 | Goldstein ............... G06F 19/00 455/456.1 |
| 2014/0067938 | A1 | 3/2014 | Boldyrev et al. |
| 2014/0114932 | A1* | 4/2014 | Mallaiah ............... G06F 3/0641 707/692 |
| 2014/0258249 | A1 | 9/2014 | Ozturk et al. |
| 2015/0003464 | A1* | 1/2015 | Zhang .................. H04L 41/083 370/400 |
| 2015/0049170 | A1* | 2/2015 | Kapadia ............... H04N 5/2621 348/46 |
| 2017/0215123 | A1* | 7/2017 | Miranda d'Orey ... H04W 4/046 |

FOREIGN PATENT DOCUMENTS

| | | |
|---|---|---|
| WO | 2007099327 A3 | 7/2007 |
| WO | 2013126784 A2 | 8/2013 |
| WO | 2014045155 | 3/2014 |

OTHER PUBLICATIONS

"The Dynamic Source Routing Protocol (DSR) for Mobile Ad Hoc Networks for IPv4", Feb. 1, 2007, published on IP.com by the IETF Trust, IPCOM000146278D.

"Adaptive data acquisition strategies for energy-efficient, smartphone-based, continuous processing of sensor streams", May 24, 2012, Lim et al., Distrib. Parallel Databases (2013) 31:321-351.

"Medusa: A Programming Framework for Crowd-Sensing Applications", Jun. 25-29, 2012, Mobisys 2012, Proceedings of the 10th International Conference on Mobile Systems, Applications, and Services, pp. 337-350, ACM, Ra et al., found on the internet at: http://csce.uark.edu/~tingxiny/courses/5013spring13/readingList/Ra12a.pdf.

"Crowdsourcing to Smartphones: Incentive Mechanism Design for Mobile Phone Sensing", Aug. 22-26, 2012, Mobicom 2012, Proceedings of the 18th Annual International Conference on Mobile Computing and Networking, pp. 173-184, ACM, Yang et al., found on the internet at: https://optimization.asu.edu/papers/XUE-CNF-2012-MOBICOM-MPSensing.pdf.

"Secure Crowdsourcing-based Cooperative Spectrum Sensing", Apr. 14-19, 2013, INFOCOM, 2013 Proceedings IEEE, pp. 2526-2534, Zhang et al., found on the internet at: http://cnsg.asu.edu/files/rui-INFOCOM13.pdf.

"Scalable Crowd-Sourcing of Video from Mobile Devices", Jun. 25-28, 2013, Mobisys 2013, Proceedings of the 11th International Conference on Mobile Systems, Applications, and Services, pp. 139-152, Simoens et al., found on the internet at: http://elijah.cs.cmu.edu/DOCS/CMU-CS-12-147.pdf.

"Combining content-based analysis and crowdsourcing to improve user interaction with zoomable video", Nov. 28 to Dec. 1, 2011, Multimedia 2011, Proceedings of the 19th ACM international conference on Multimedia, pp. 43-52, Carlier et al, found on the internet at: http://www.comp.nus.edu.sg/~ooiwt/papers/mm11-zoom-ui.pdf.

"CrowdSearch: exploiting crowds for accurate real-time image search on mobile phones" Jun. 15-18, 2010, Mobisys 2010, Proceedings of the 8th International Conference on Mobile Systems, Applications, and Services, pp. 77-90, ACM, Yan et al, found on the internet at: http://people.cs.umass.edu/~dganesan/papers/MobiSys10-CrowdSearch.pdf.

"Coping with irregular spatio-temporal sampling in sensor networks", Jan. 1, 2003, Ganesan et al., found on the internet at: http://escholarship.org/uc/item/7vd51134.

"On tile assignment for region-of-interest video streaming in a wireless LAN", Jun. 7-8, 2012, NOSSDAV 2012, Proceedings of the 22nd international workshop on Network and Operating System Support for Digital Audio and Video, pp. 59-64, Ravindra et al, found on the internet at: http://www.comp.nus.edu.sg/~ooiwt/papers/nossdav12-roi.pdf.

"Efficient Temporal Compression in Wireless Sensor Networks", Oct. 4-7, 2011, 36th Annual IEEE Conference on Local Computer Networks, Yao Liang, found on the internet at: file:///C:/Users/Paul/Downloads/Liang%20LCN2011.pdf.

AUS920140222US2, Nov. 2, 2015, U.S. Appl. No. 14/929,472.
AUS920140136US1, Apr. 21, 2015, U.S. Appl. No. 14/691,887.
AUS920140136US2, Aug. 24, 2015, U.S. Appl. No. 14/833,466.
AUS920140222US1, Apr. 21, 2015, U.S. Appl. No. 14/691,713.

"List of IBM Patents or Patent Applications Treated as Related" dated Apr. 13, 2016, including U.S. Appl. No. 14/691,887, filed Apr. 21, 2015; U.S. Appl. No. 14/833,466, filed Aug. 24, 2015; and U.S. Appl. No. 14/691,713, filed Apr. 21, 2015.

Sedaghat et al., "Detecting spatio-temporal outliers in crowdsourced bathymetry data," Proceedings of the Second ACM SIGSPATIAL International Workshop on Crowdsourced and Volunteered Geographic Information, Nov. 2013, Orlando, FL, pp. 55-62.

Yi et al., "Semi-Crowdsourced Clustering: Generalizing Crowd Labeling by Robust Distance Metric Learning," Dec. 2012, Neural Information Processing Systems Conference, Lake Tahoe, NV, 9 pages.

Willett et al., "Identifying Redundancy and Exposing Provenance in Crowdsourced Data Analysis," IEEE Transactions on Visualization and Computer Graphics, vol. 19, Issue 12, Dec. 2013, 9 pages.

Updated "List of IBM Patents or Patent Applications Treated as Related" dated Sep. 21, 2017, including U.S. Appl. No. 14/691,887, filed Apr. 21, 2015; U.S. Appl. No. 14/833,466, filed Aug. 24, 2015; U.S. Appl. No. 14/691,713, filed Apr. 21, 2015; and U.S. Appl. No. 15/705,895, filed Sep. 15, 2017.

* cited by examiner

CROWD SOURCED DATA SAMPLING AT THE CROWD

This application is a continuation of application Ser. No. 14/691,713 filed Apr. 21, 2015 entitled "Crowd Sourced Data Sampling at the Crowd", the disclosure of which is incorporated in its entirety herein by reference.

BACKGROUND OF THE INVENTION

Technical Field

This disclosure relates to data sampling. More particularly, this disclosure relates to sampling crowd sourced information received from mobile devices.

Description of Related Art

When acquiring crowd sourced information from mobile sources, a large body of data is accumulated, taxing both networks and storage repositories. Crowdsourcing is the process of obtaining needed services, ideas, or content by soliciting contributions from a large group of people, and especially from an online community, rather than from traditional employees or suppliers. The process of crowdsourcing is often used to subdivide tedious work. Crowdsourcing combines the efforts of numerous self-identified volunteers or part-time workers, where each contributor of their own initiative adds a small portion to the greater result. The term "crowdsourcing" is a combination of the terms "crowd" and "outsourcing." Crowdsourcing is distinguished from outsourcing in that the work comes from an undefined public rather than being commissioned from a specific, named group.

When acquiring crowd sourced information from mobile sources, a large body of data is accumulated, taxing both networks and storage repositories. Uploading data gathered by the crowd can overwhelm wireless networks, such as those used by mobile information handling system, such as mobile smart phones.

SUMMARY

An approach is provided for sampling crowd sourced data. The approach selects an sampling node from a set of crowd nodes. The sampling node receives a data acquisition request from a data collector and receives data from the set of crowd nodes with the data being responsive to the data acquisition request. The received data is processed by the sampling node to reduce redundant data as defined by the data acquisition request. An acquired data message block is generated and transmitted from the sampling node to the data collector.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
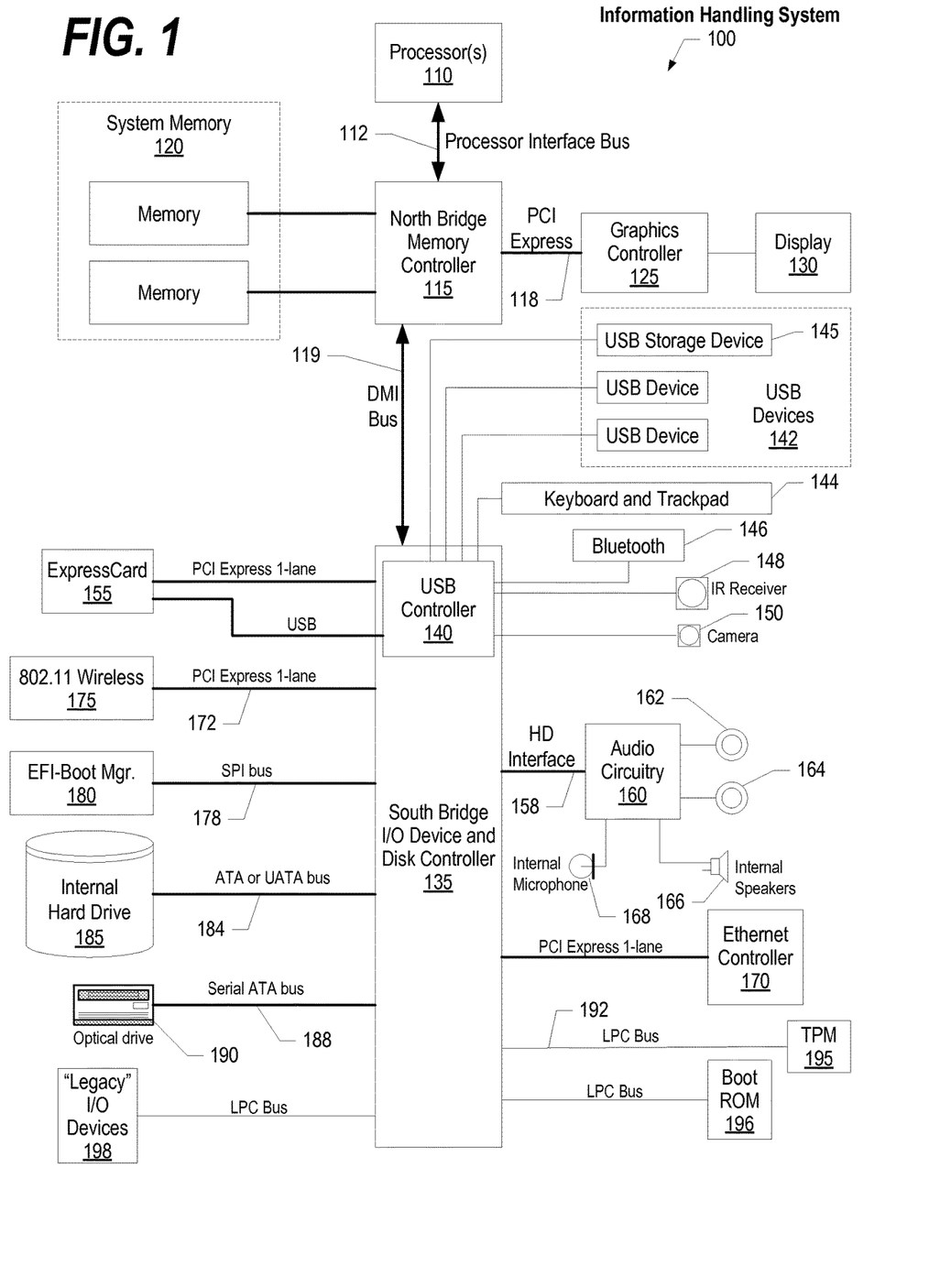
FIG. 1 depicts a block diagram of a processor and components of an information handling system.
Figure 2:
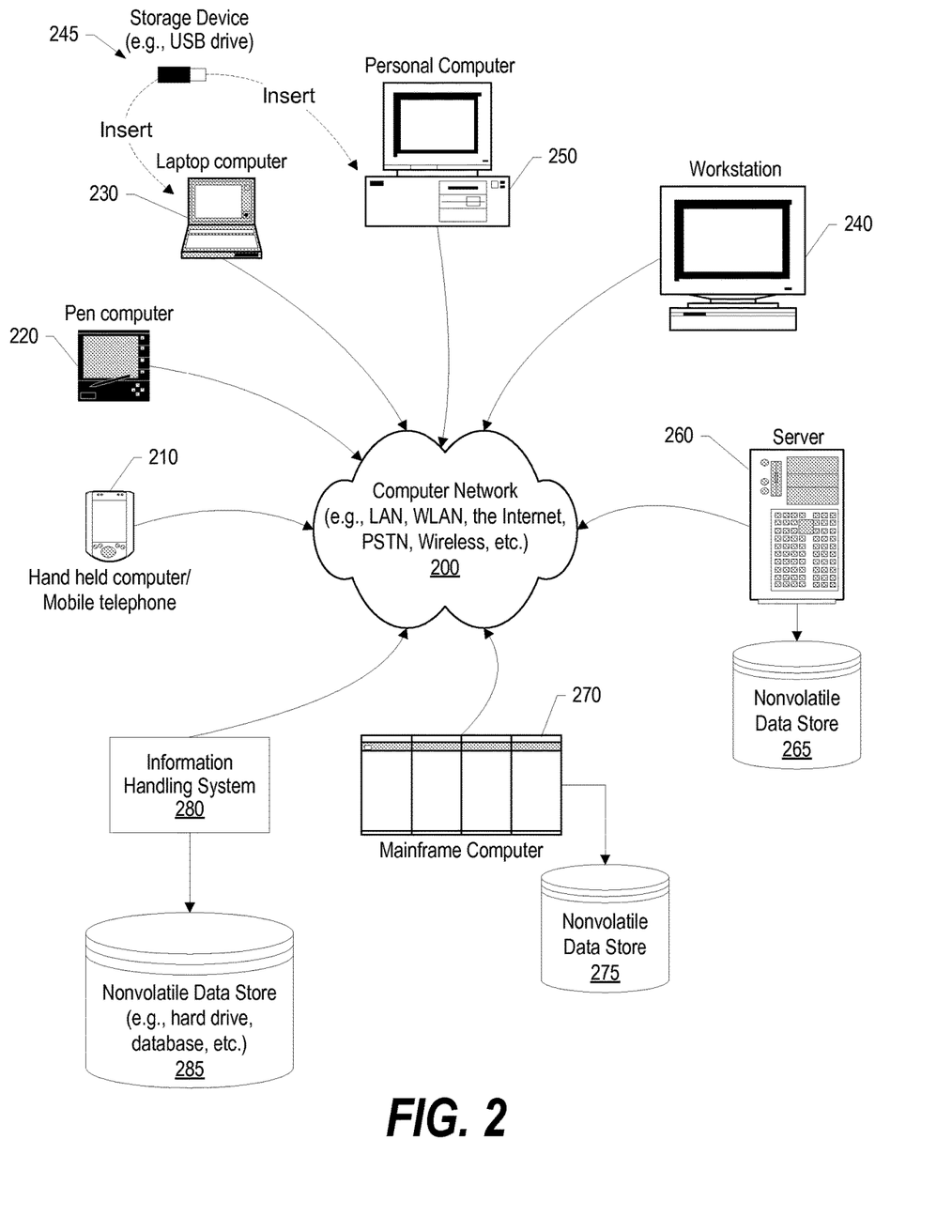
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-7 show an approach for sampling crowd sourced data at the source. This approach accumulates and tracks the quantity of redundant data in the crowd as opposed to propagating the redundant data itself. In addition, this approach defines the edges of the redundant data where it transitions to becoming non-redundant. This results in a reduced amount of data while retaining the ability to reconstruct the data distribution. Essentially the approach drives some of the abstraction decisions and work lower in the hierarchy thereby minimizing the network and cloud storage burden by taking advantage of the processing power at the data collection endpoint.

The approach utilizes a "sampling node" that is appointed, selected, volunteers, or otherwise becomes known to the Cloud Collector Server. The Cloud Collector Server communicates the data acquisition definition message block to the sampling node with the message block defining data items of interest to the collector, parameter k describing the range of data that is considered to be redundant, the period of collection, and the collection radius. The sampling node recruits crowd sources (nodes) within collection radius and receives data from the nodes within collection radius. The sampling node analyzes data to determine regions of redundant data and geo-locates the regions of commonality and the locations of transitions to non-redundant data. The sampling node returns the abstracted (non-redundant) data back to the Cloud Collector Server.

The data collected does not have to be scalar data. The techniques described herein can be deployed with complicated data such as images. In one embodiment, k defines the degree of similarity of an image that would be considered redundant.

Once data is collected, it it sent by the sampling node to a server in the cloud for further processing and storage. In order to provide redundancy for the communications link from the sampling node to the cloud, collection nodes could be used on an ad-hoc and temporary basis. Each of these nodes could be queried for the data services and speeds they support, and a set of nodes can be selected dynamically to send the data to the cloud in an aggregated way. This approach further provides additional transmission redundancy when collecting the data.

By way of an example, assume that a data collector wishes to collect video data of a parade traveling down a particular street. Crowd nodes might include spectators lining the street watching the parade. The sampling node might group the crowd nodes into collections based on their geo-locations. For example, crowd nodes on the north side of the street between first and second avenue might be grouped into one collection, crowd nodes on the south side of the street between first and second avenue might be grouped into another collection, crowd nodes on the north side of the street between second and third avenue might be grouped into a third collection, crowd nodes on the south side of the street between second and third avenue might be grouped into another collection, and so on. The sampling node receives data (e.g., video, sound, etc.) from crowd nodes, reduces redundancy, and transmits a representative data to the data collector so that the data collector receives a limited set (e.g., one, etc.) of audio/video from each of the collections rather than receiving all of the data from each of the collections. In addition, the sampling node provides metadata pertaining to the various collections such as the geo-located region of each of the collections and the number of duplicate nodes included in each of the collections.

Figure 3:
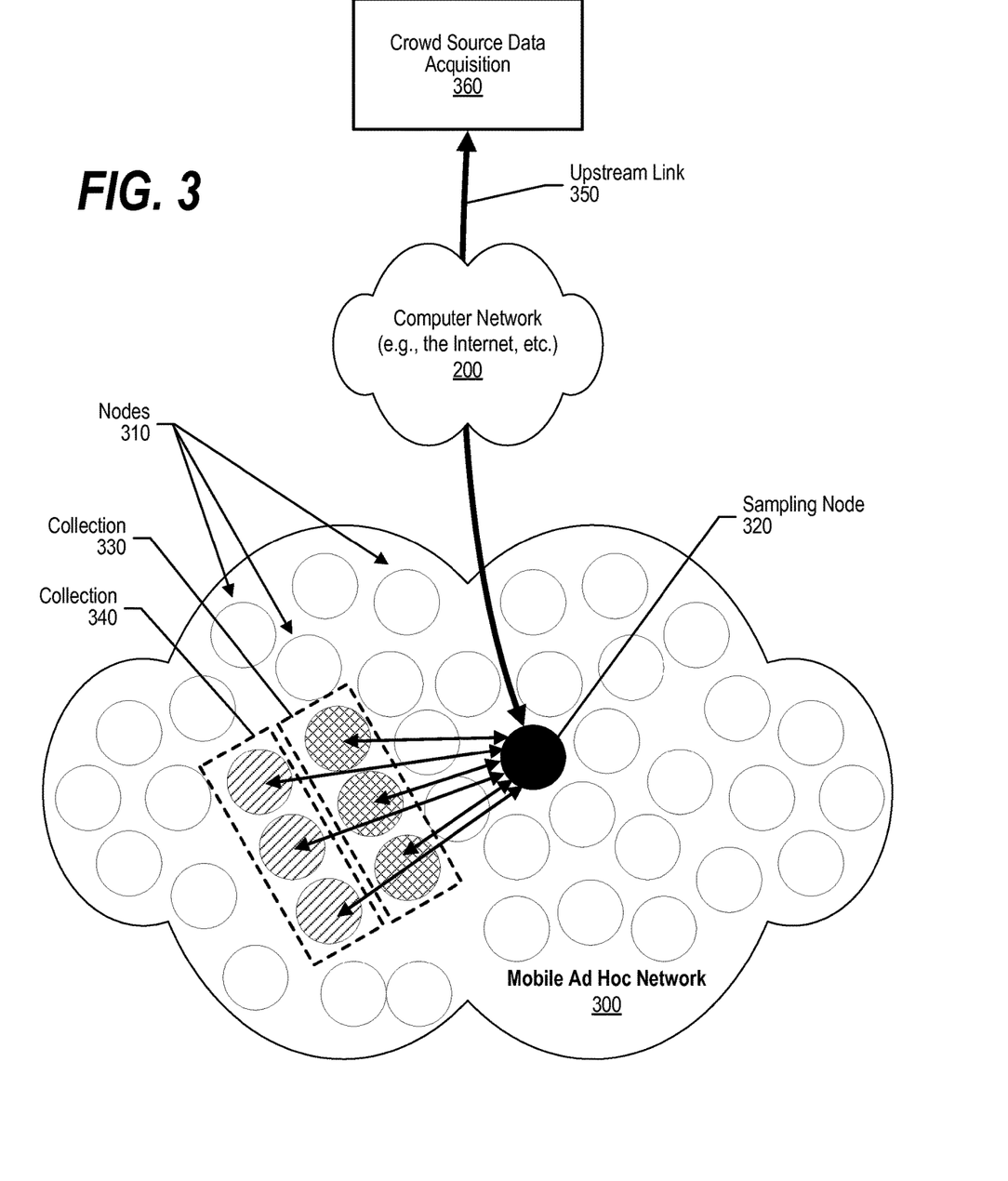
FIG. 3 is a diagram depicting an example crowd source data acquisition using an sampling node and nodes in two sets of collections.

FIG. 3 is a diagram depicting an example crowd source data acquisition using an sampling node and nodes in two sets of collections. Mobile ad hoc network 300 is used to communicate between nodes included in an area where data is being collected, such as video data pertaining to the parade used in the previous example. The mobile ad hoc network includes any number of crowd nodes 310. Sampling node 320 is selected from the set of crowd nodes. Collections of crowd nodes are identified, such as collection 330 and collection 340. Using the parade example from above, collection 330 might be crowd nodes on the north side of the street between first avenue and second avenue and collection 340 might be crowd nodes on the south side of the street between first avenue and second avenue. Sampling node 320 receives data from the nodes and abstracts the data by reducing redundant data. Sampling node 320 prepares an acquired data message block that includes representative data from each of the collections and the metadata (number of redundant nodes, etc.) pertaining to each of the collections. The acquired data message block is transmitted from sampling node 320 to data collector 360 via upstream link 350 by way of computer network 200, such as the Internet.

In one embodiment, a transmission node is selected from the set of crowd nodes, for example the transmission node might be selected based on its superior bandwidth or transmission speed of the transmission node through computer network 200. In this embodiment, the sampling node would transmit the acquired data message block to the transmission node which would in turn send the acquired data message block to data collector 360 via upstream link 350 through computer network 200.

Figure 4:
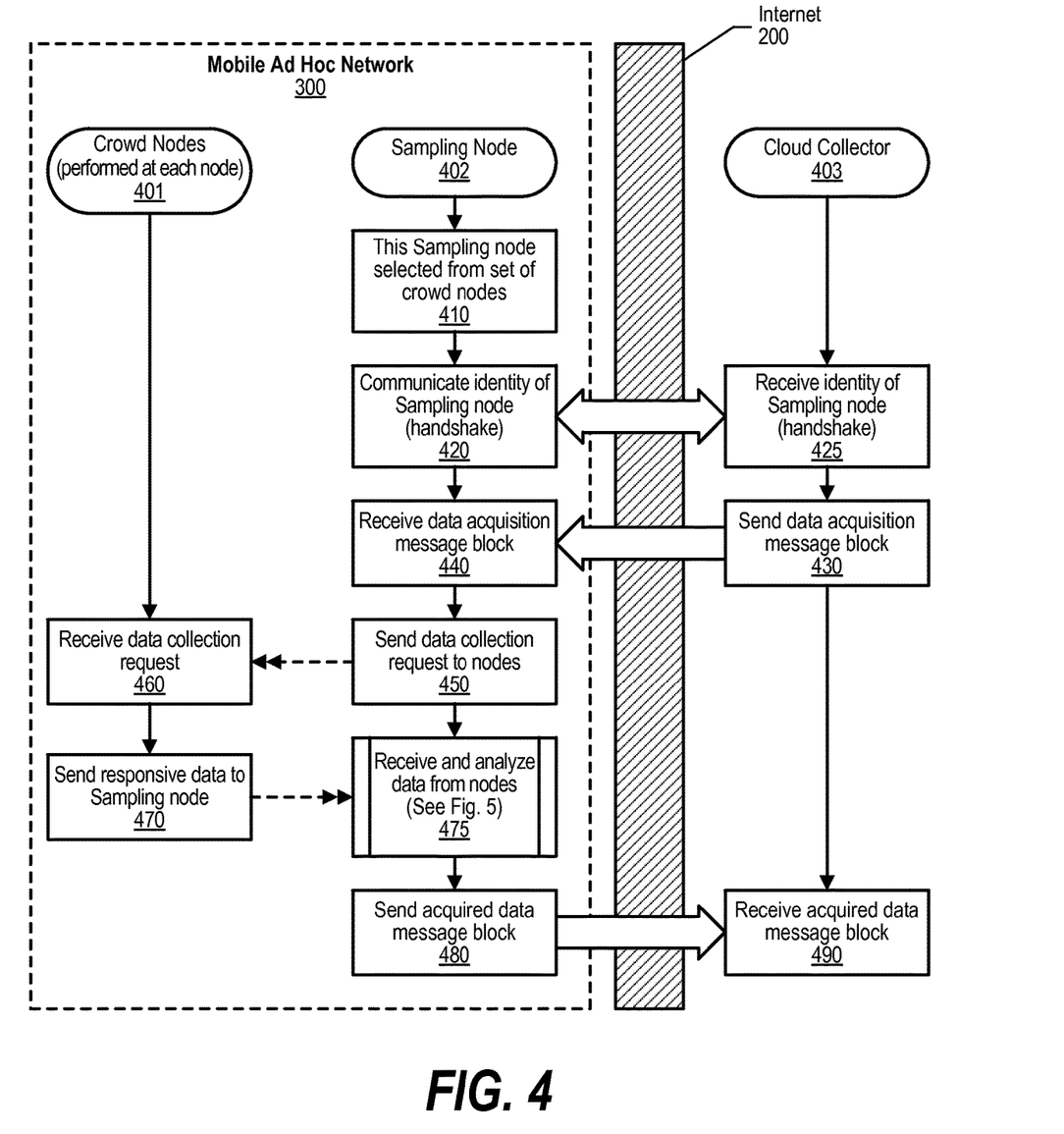
FIG. 4 is a diagram showing interaction between crowd nodes, the sampling node, and the cloud collector during abstract crowd sourced data at the source.

FIG. 4 is a diagram showing interaction between crowd nodes, the sampling node, and the cloud collector during abstract crowd sourced data at the source. Mobile ad hoc network 300 includes crowd nodes and the sampling node that is selected from the set of crowd nodes. Processing performed by regular crowd nodes commences at 401. Processing performed by the sampling node commences at 402, and processing performed by the collector node commences at 403.

At step 410, a process selects the sampling node from the set of crowd nodes. At step 420, the sampling node communicates its identity to the collector node (e.g., a handshaking process, etc.). At step 425, the collector node receives the identity of sampling node (e.g., via the handshaking process, etc.). At step 430, the collector node sends a data acquisition message block to the sampling node with the data acquisition message block defining the data that the data collector wishes to collect from the crowd source and defines the geographic area and the node parameters that are considered to be redundant. At step 440, the sampling node receives the data acquisition message block from the collector node. At step 450, the sampling node broadcasts the data collection request to the crowd nodes. At step 460, each crowd node receives the data collection request from the sampling node. At step 470, each crowd node collects and sends responsive data to sampling node with the data pertaining to the data collection request. At predefined process 475, the sampling node performs the Receive and Analyze Data from Nodes routine (see FIG. 5 and corresponding text for processing details). The result of predefined process 475 is a acquired data message block. At step 480, the sampling node sends the acquired data message block to the data collector and, at step 490, the data collector receives the acquired data message block from the sampling node.

Figure 5:
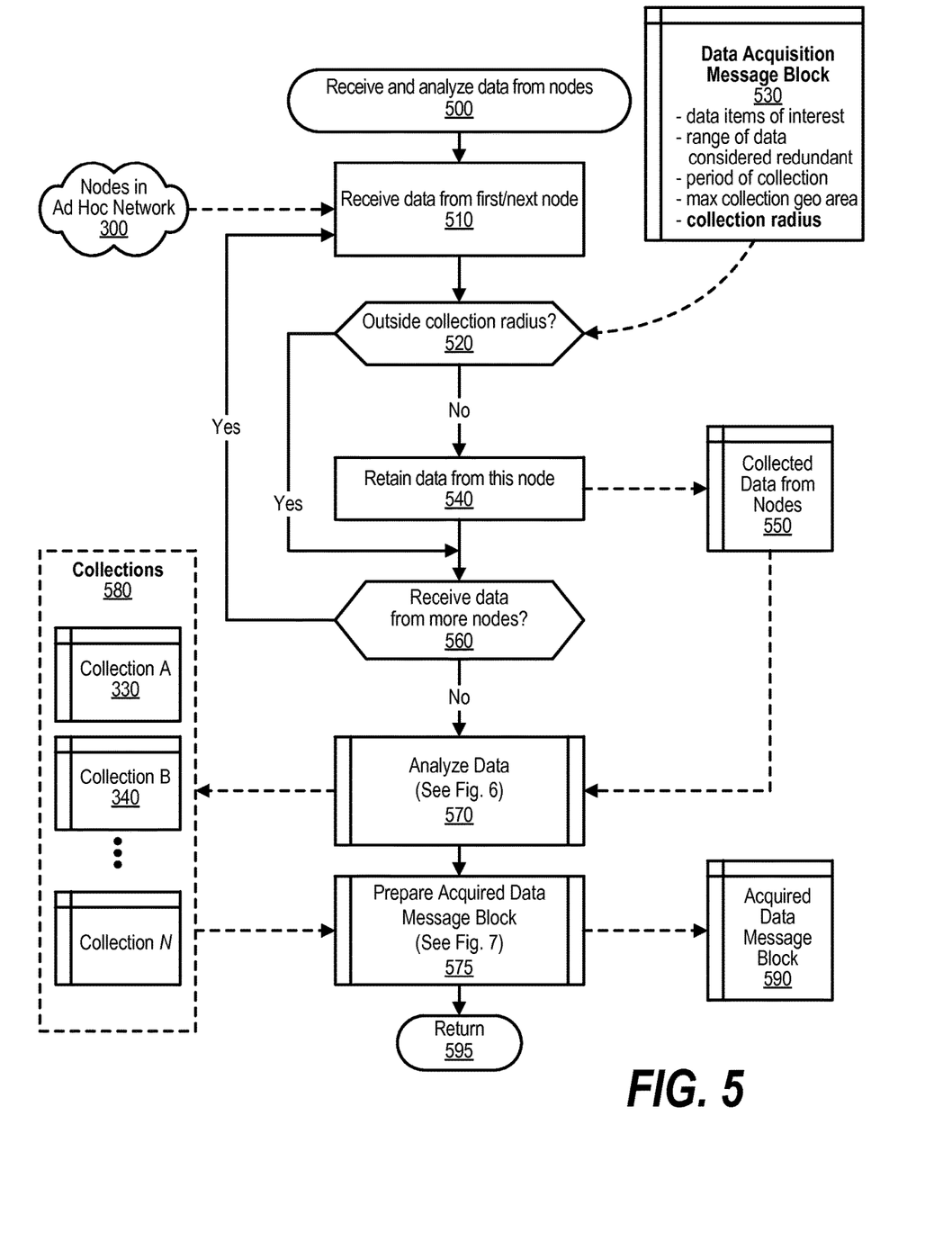
FIG. 5 is a flowchart showing steps taken to receive and analyze data from crowd nodes.

FIG. 5 is a flowchart showing steps taken to receive and analyze data from crowd nodes. FIG. 5 processing commences at 500 and shows the steps taken by a process that performs a routine that receives and analyzes data received from crowd nodes. At step 510, the process receives data from the first node in ad hoc network 300. The process determines as to whether the node is outside of the collection radius (decision 520). If the node is outside of the collection radius, then decision 520 branches to the 'yes' branch bypassing step 540. On the other hand, if the node is within the collection radius, then decision 520 branches to the 'no' branch whereupon, at step 540, the process retains data received from this node and stores the data in memory area 550.

The data collected from the crowd nodes and the amount of abstraction is determined by data acquisition message block 530 that was received from the data collector and defines the data that is being collected. The data acquisition message block defines the data items of interest (e.g., video of a particular parade, etc.), the range of data considered redundant, the period of collection, the maximum collection geographic area, and the collection radius. The collection radius defines the overall collection area (e.g., the area of the city where the parade is occurring, etc.) and the maximum collection geographic area is used to define a collection area within the overall collection area (e.g., a city block on one side of the street, etc.).

Using the parade example previously introduced, assume that the range of data considered redundant are videos taken at a similar orientation to each other, such as within five degrees, so that a video pointed at the parade at a 90 degree angle from the street would be considered redundant with another video being taken at an 87 degree angle from the street, but would not be redundant with a video being taken at a shallow angle, such as 30 degrees from the street (looking at the parade as it approaches the user) nor with a video being taken at an opposite angle, such as a 150 degree angle (looking at the parade as it goes away from the user).

The maximum collection geographic area might be a city block so that another video being taken at a 90 degree angle at a different block would not be considered redundant because the first video with a 90 degree viewing angle is in a different collection area as the second video with a 90 degree viewing angle. The collection radius is the overall collection area that contains all of the various collections. So, if the collection radius is defined as ten blocks in the downtown area of the city where the parade is being performed, then data is only retrieved from this ten block area even if the parade starts or ends somewhere outside this collection radius.

The process determines as to whether the sampling node is receiving data from more nodes in the ad hoc network (decision 560). If the sampling node is receiving data from more nodes in the ad hoc network, then decision 560 branches to the 'yes' branch which loops back to step 510 to receive data from the next crowd node. This looping continues until the sampling node has received data from all of the nodes, at which point decision 560 branches to the 'no' branch and analysis of the collected data continues.

Figure 6:
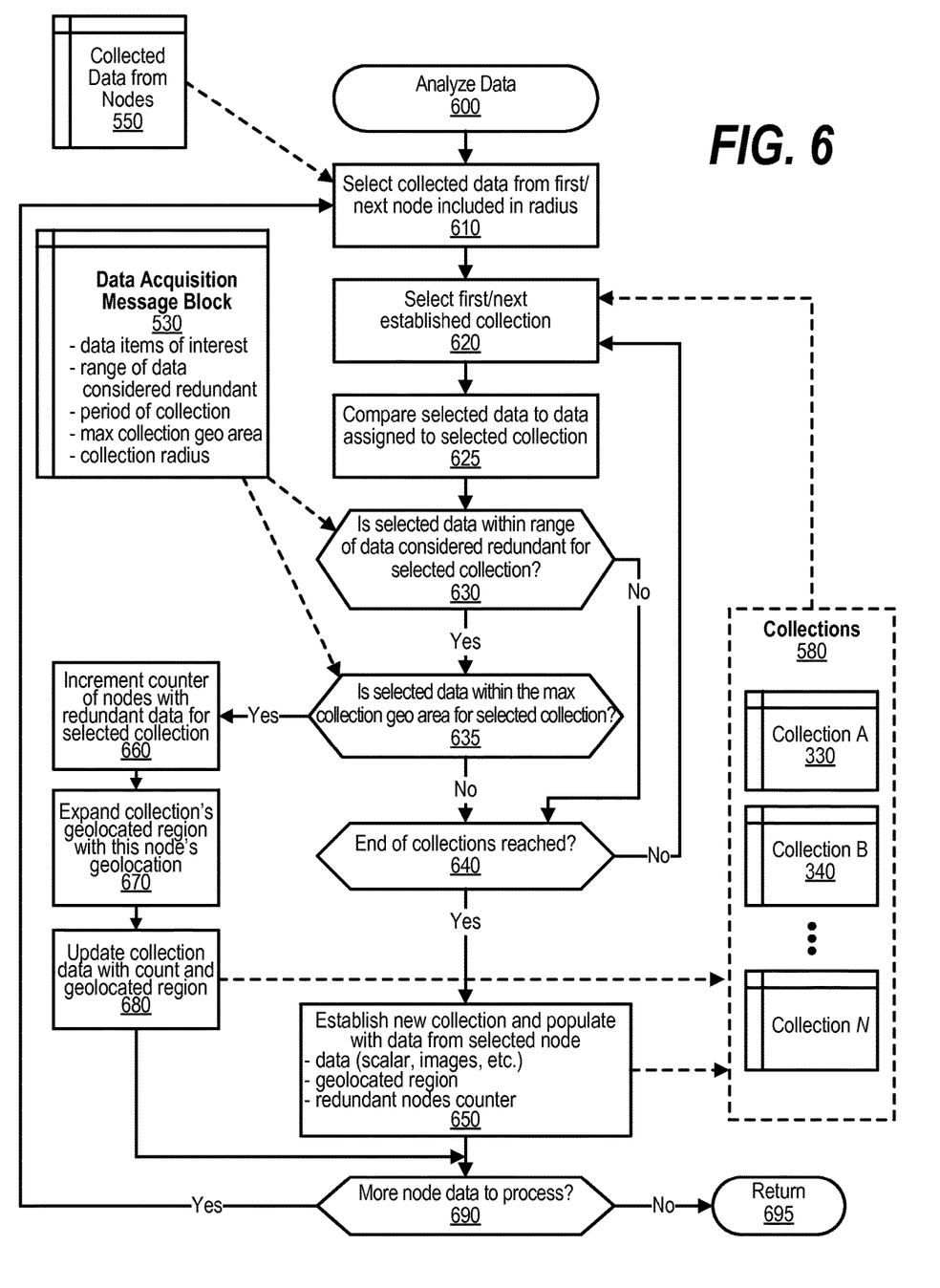
FIG. 6 is a flowchart showing steps taken to further analyze data received from crowd nodes.

At predefined process 570, the process performs the Analyze Data routine (see FIG. 6 and corresponding text for processing details). Data collected from nodes and stored in memory area 550 is analyzed and abstracted into a set of collections 580.

Figure 7:
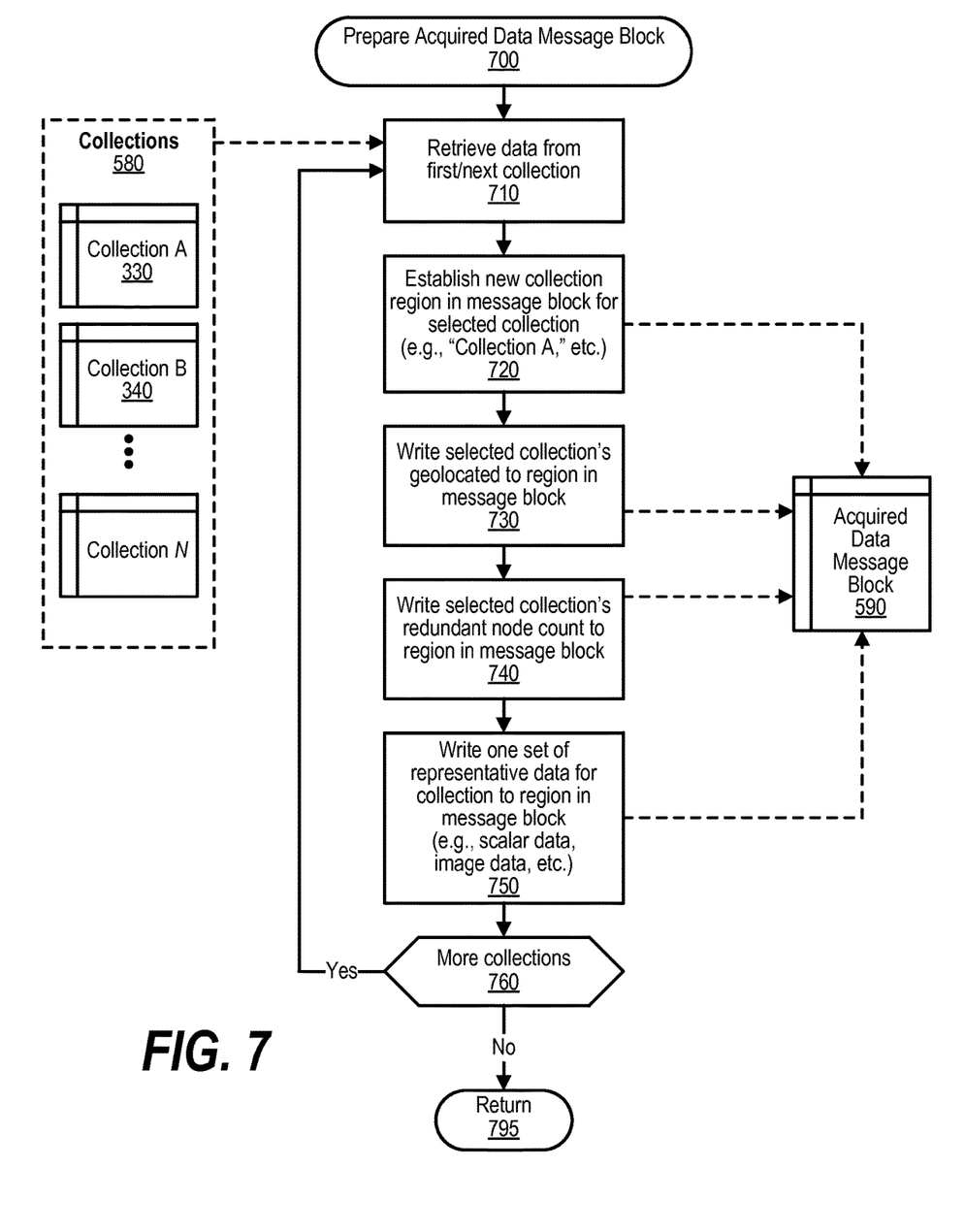
FIG. 7 is a flowchart showing steps taken by the sampling node to prepare an acquired data message block that is transmitted to a cloud collector.

At predefined process 575, the process performs the Prepare Acquired Data Message Block routine (see FIG. 7 and corresponding text for processing details). During predefined process 575, data stored in the various collections is used to prepare acquired data message block 590 that is eventually returned to the data collector. FIG. 5 processing thereafter returns to the calling routine (see FIG. 4) at 595.

FIG. 6 is a flowchart showing steps taken to further analyze data received from crowd nodes. FIG. 6 processing commences at 600 and shows the steps taken by a process that performs a routine that analyzes data received by crowd nodes. At step 610, the process selects collected data from the first node included in the collection radius with the collected data being retrieved from memory area 550. At step 620, the process selects the first established collection (if any collections have been established—if no collections have been established then processing eventually falls through to step 650 to establish a new collection as described in further detail below).

At step 625, the process compares the selected data to the data assigned to the selected collection. The process determines as to whether the selected data is within the range of data considered redundant for the selected collection as determined by the data acquisition message block (decision 630). If the selected data is within the range of data considered redundant for the selected collection, then decision 630 branches to the 'yes' branch to handle possible redundant data. On the other hand, if the selected data is not within the range of data considered redundant for the selected collection, then decision 630 branches to the 'no' branch bypassing decision 635 and steps 660, 670, and 680.

The process determines as to whether the selected data is within the maximum collection geographic area for selected collection (decision 635). If the selected data is within the maximum collection geographic area for selected collection, then decision 635 branches to the 'yes' branch to process redundant data using steps 660, 670, and 680. On the other hand, if the selected data is not within the maximum collection geographic area for selected collection, then decision 635 branches to the 'no' branch bypassing steps 660 through 680.

The process determines as to whether the end of the set of established collections has been reached without finding a match for the selected data (decision 640). If the end of the set of established collections has been reached without finding a match for the selected data, then decision 640 branches to the 'yes' branch to establish a new collection at step 650. On the other hand, if the end of the set of established collections has not yet been reached, then decision 640 branches to the 'no' branch which loops back to select the next established collection from the set of collections 580.

At step 650, the process establishes a new collection and populates the new collection with representative data from the selected node. The data (e.g., scalar data, images, videos, etc.) is collected along with collections metadata that includes the geo-located region of the collection and a redundant nodes counter which is initially set to zero.

Returning to decision 635, if a redundant node is encountered, decision 635 branches to 'yes' branch to perform steps 660 through 680. At step 660, the process increments the counter of nodes with redundant data for the selected collection. At step 670, the process expands the selected collection's geo-located region with this node's geo-location. At step 680, the process updates the collection data stored in 580 with the updated counter data and expanded geo-located region data.

The process determines as to whether there is data from more node data to process (decision 690). If there is data from more node data to process, then decision 690 branches to the 'yes' branch. On the other hand, if not more node data to process, then decision 690 which loops back to step 610 to select and process data from the next node as described above. This looping continues until there is no more node data to process, at which point decision 690 branches to the 'no' branch and FIG. 6 processing thereafter returns to the calling routine (see FIG. 5) at 695.

FIG. 7 is a flowchart showing steps taken by the sampling node to prepare an acquired data message block that is transmitted to a cloud collector. FIG. 7 processing commences at 700 and shows the steps taken by a process that performs a routine that prepares the acquired data message block for transmission to the data collector.

At step 710, the process retrieves data from the first collection included in memory area 580. At step 720, the process establishes a new collection region in acquired data message block 590 for storing data from the selected collection (e.g., "Collection A," etc.). At step 730, the process writes the selected collection's geo-located region to the region established in the acquired data message block for this collection in memory area 590. The geo-located region data is written to the acquired data message block (memory area 590).

At step 740, the process writes the selected collection's redundant node count to the region in acquired data message block 590 established for this collection. The node count indicates the number of redundant nodes found to be in the collection.

At step 750, the process writes one set of representative data for the selected collection to the region acquired data message block 590. For example, the representative data might be scalar data, image data, video data, etc.

The process determines as to whether there are more collections to process (decision 760). If there are more collections to process, then decision 760 branches to the 'yes' branch which loops back to 710 to retrieve data corresponding to the next collection included in collections memory area 580. This looping continues until there are no more collections to process, at which point decision 760 branches to the 'no' branch and processing returns to the calling routine (see FIG. 5) at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising one or more processors and a memory of sampling crowd sourced data, the method comprising:
    selecting a sampling node from a plurality of crowd nodes;
    receiving, at the sampling node, a data acquisition request from a data collector; receiving, at the sampling node, data from the plurality of crowd nodes,
    wherein the data is responsive to the data acquisition request;
    processing, by the sampling node, the received data, wherein the processing reduces redundant data as defined by the data acquisition request and results in an acquired data message block;
    transmitting the acquired data message block from the sampling node to the data collector;
    establishing, by the sampling node, a plurality of collections wherein each collection includes at least one of the plurality of crowd nodes;
    defining a geo-located region pertaining to each of the collections;
    collecting a representative data from at least one of the crowd nodes included in each of the collections;
    counting a number of nodes included in each of the collections that have redundant data as defined by the data acquisition request;
    expanding each of the collections' geo-located regions based on a geo-location of the one or more crowd nodes included in each of the respective collections;
    wherein the data acquisition request includes a redundancy parameter and a maximum collection geographic area parameter, wherein the method further comprises:
    establishing a maximum size of each of the geo-located regions based on the maximum collection geographic area parameter;
    receiving a first data from a first node of the plurality of crowd nodes and a second data from a second node of the plurality of crowd nodes, the first data corresponding to a first collection area and the second data corresponding to a second collection area,
    wherein the first and second nodes are selected from the plurality of collections;
    identifying that the received first and second data are within the redundancy parameter; and
    determining, based on the first collection area being different from the second collection area, that the received first and second data are not redundant.

2. A method, in an information handling system comprising one or more processors and a memory of sampling crowd sourced data, the method comprising:
    selecting a sampling node from a plurality of crowd nodes;
    receiving, at the sampling node, a data acquisition request from a data collector, the data acquisition request including a redundancy parameter and a maximum collection geographic area parameter;
    receiving, at the sampling node, data from the plurality of crowd nodes,
    wherein the data is responsive to the data acquisition request;
    processing, by the sampling node, the received data, wherein the processing reduces redundant data as defined by the data acquisition request and results in an acquired data message block;
    transmitting the acquired data message block from the sampling node to the data collector;
    establishing, by the sampling node, a plurality of collections wherein each collection includes at least one of the plurality of crowd nodes;
    defining a geo-located region pertaining to each of the collections;
    collecting a representative data from at least one of the crowd nodes included in each of the collections;
    counting a number of nodes included in each of the collections that have redundant data as defined by the data acquisition request;
    expanding each of the collections' geo-located regions based on a geo-location of the one or more crowd nodes included in each of the respective collections;
    establishing a maximum size of each of the geo-located regions based on the maximum collection geographic area parameter;
    receiving a first data from a first node of the plurality of crowd nodes and a second data from a second node of the plurality of crowd nodes, wherein the first and second nodes are both in a first collection selected from the plurality of collections;
    identifying that the received first and second data are within the redundancy parameter; and
    in response to identifying redundancy between the first data and the second data, including the first data in the acquired data message block and discarding the second data.

* * * * *